United States Patent
Civilla (10) Patent No.: US 9,562,622 B2
(45) Date of Patent: Feb. 7, 2017

(54) EXTENSION DEVICE FOR CLOSURE MECHANISM

(71) Applicant: Adam Civilla, Denver, CO (US)

(72) Inventor: Adam Civilla, Denver, CO (US)

(73) Assignee: Knob Where You Need It, LLC, Denver, CO (US)

( * ) Notice: Subject to any disclaimer, the term of this patent is extended or adjusted under 35 U.S.C. 154(b) by 0 days.

(21) Appl. No.: 14/562,190

(22) Filed: Dec. 5, 2014

(65) Prior Publication Data

US 2015/0159773 A1    Jun. 11, 2015

Related U.S. Application Data (60) Provisional application No. 61/912,130, filed on Dec. 5, 2013.

(51) Int. Cl.
| | |
|---|---|
| F16K 31/46 | (2006.01) |
| F16K 31/53 | (2006.01) |
| F23N 1/00 | (2006.01) |
| A47J 37/07 | (2006.01) |

(52) U.S. Cl.
CPC .......... *F16K 31/465* (2013.01); *A47J 37/0713* (2013.01); *A47J 37/0786* (2013.01); *F16K 31/535* (2013.01); *F23N 1/007* (2013.01); *F23N 2023/38* (2013.01)

(58) Field of Classification Search
CPC ...... F16K 31/465; F16K 31/535; F23N 1/007; F24B 3/00; A47J 37/00
See application file for complete search history.

(56) References Cited

U.S. PATENT DOCUMENTS

| | | | | |
|---|---|---|---|---|
| 1,557,390 | A | * 10/1925 | Tolk | B60R 17/00 184/1.5 |
| 2,657,705 | A | * 11/1953 | Gerhard | F01M 11/0408 137/351 |
| 3,183,301 | A | 5/1965 | Kompanek, Jr. et al. | |
| 3,598,361 | A | * 8/1971 | Crowe | F16K 31/465 251/144 |
| 3,623,698 | A | * 11/1971 | Couper | F01M 11/0408 251/264 |
| 4,509,387 | A | 4/1985 | Tschanz et al. | |
| 4,573,378 | A | * 3/1986 | McDonald | B25B 27/24 294/211 |
| 4,637,423 | A | * 1/1987 | Gray | F16K 31/163 137/382.5 |
| 4,834,137 | A | * 5/1989 | Kawaguchi | F17C 13/123 137/312 |

(Continued)

FOREIGN PATENT DOCUMENTS

EP    1647751 A1    4/2006

*Primary Examiner* — Craig Schneider
*Assistant Examiner* — Kevin Barss
(74) *Attorney, Agent, or Firm* — Dorsey & Whitney LLP (57) ABSTRACT

An extension device for remotely opening and closing a valve from a user knob is described. The device includes a flexible connector that allows the user knob to be positioned in various places relative the valve. One use for the disclosed device is with a gas grill, wherein the gas tank is placed in a position that is not easily accessible or is difficult for some persons to access. The extension device may be mounted in various positions on or near the grill allowing the user to open and close the gas tank's valve before and after use of the grill.

20 Claims, 8 Drawing Sheets

(56) References Cited

U.S. PATENT DOCUMENTS

| | | | |
|---|---|---|---|
| 4,970,912 A | | 11/1990 | Wolf |
| 5,076,252 A | * | 12/1991 | Schlosser ............ A47J 37/0713 |
| | | | 126/25 R |
| 5,195,393 A | | 3/1993 | Wolfington et al. |
| 5,381,706 A | | 1/1995 | Yanusko et al. |
| 5,482,251 A | | 1/1996 | Roberts |
| 5,711,511 A | * | 1/1998 | Cynar .................... F16K 31/46 |
| | | | 137/360 |
| 5,727,772 A | * | 3/1998 | Rothammer ............. E03C 1/05 |
| | | | 251/229 |
| 6,186,475 B1 | | 2/2001 | Selepouchin |
| 6,279,870 B1 | | 8/2001 | Welz, Jr. et al. |
| 8,413,957 B2 | | 4/2013 | Fandel |
| 2004/0113116 A1 | | 6/2004 | London et al. |
| 2008/0289615 A1 | * | 11/2008 | Parrish ................ A47J 37/0713 |
| | | | 126/25 R |
| 2012/0073670 A1 | | 3/2012 | Lymberopoulos |
| 2012/0074340 A1 | * | 3/2012 | Carolei .................. F16K 31/60 |
| | | | 251/213 |
| 2012/0241657 A1 | * | 9/2012 | Sisk .................... F16K 27/0218 |
| | | | 251/293 |
| 2014/0027659 A1 | * | 1/2014 | Kumar .................... F16K 31/46 |
| | | | 251/213 |
| 2014/0264119 A1 | * | 9/2014 | Abu-Shaikha ......... G09B 19/00 |
| | | | 251/213 |
| 2015/0369390 A1 | * | 12/2015 | Dzolovic ................ F16K 31/60 |
| | | | 251/110 |

\* cited by examiner

EXTENSION DEVICE FOR CLOSURE MECHANISM

CROSS REFERENCE TO RELATED APPLICATIONS

This application claims benefit of priority pursuant to 35 U.S.C. §119(e) of U.S. provisional patent application No. 61/912,130, filed Dec. 5, 2013, which is hereby incorporated herein by reference in its entirety.

FIELD

The disclosed processes, methods, and systems are directed to devices and methods for remote operation of a closure mechanism, for example a closure valve on a propane tank.

BACKGROUND

An estimated 80 million Americans use these propane tanks at their homes. For example, most gas grills used for outdoor grilling or "barbequing" have propane tanks with a handle to turn the flow of gas on and off. Propane in the tank passes through a main valve positioned on the tank, through a hose, to the grill. In many cases, the hose connecting the propane tank to the grill is a flexible rubber hose, which may aid the user in allowing the propane tank to be positioned in various places near the grill. The flexible hose may also aid in accommodating propane tanks of various sizes.

The amount of propane delivered to the grill's burners is usually controlled by a regulator valve on the grill. This regulator valve helps to control the amount of gas entering the burners and the therefore the heat of the grill. The amount of gas reaching the regulator valve is dependent on the position of the main valve on the propane tank. This main valve is opened and closed by the user rotating a valve knob, which is usually positioned at the top of the propane tank.

The main valve is the first control point for the flow of propane to the grill. So long as the main valve on the propane tank is open, and propane is in the tank, propane can enter the hose leading to the grill. With propane in the hose, the grill may be turned "off" and "on" by positioning the regulator valve in the "off" or "on" position, respectively, and the intensity of the flames controlled by the degree to which the regulator valve is open. However, if the main valve on the propane tank is in the "closed" position, no gas will be delivered to the grill, even if the regulator valve is in the "open" position.

Many users choose to close the main valve on the propane tank when the grill is not in use. This may prevent unwanted leakage of propane and/or inadvertent ignition of the grill. While the regulator valves, near the burners, are controlled by a knob that is usually positioned at or near the face of a grill, the main valve must be opened and closed by grabbing and turning the knob by hand. This requires accessing the propane tank main valve. Accessing the propane tank may not be easy, as the tank may, in some cases, be positioned out of sight—often below, and/or behind the grill. In some cases, the propane tank may be positioned within a housing that must be opened to reveal the propane tank. Accessing the valve knob of the propane tank may require the user to bend down or lean over, in order to see and grasp the valve knob. This may be inconvenient and in some cases, such as where the grill is hot, dangerous. Thus, inaccessible or inconveniently located valve knobs present potential hazards for the users of propane grills.

What is needed is the ability to open and close the main valve of a propane tank, even when the tank is not easily accessed by hand.

SUMMARY

Disclosed herein are extension devices for remotely operating a valve, the device comprising an adaptor, a user knob, and a connector, the connector comprising a housing and a rod positioned within the housing, wherein the rod is connected at one end to the adaptor and at the other end to the user knob. The housing can be attached to a side of a grill at or near the user knob, or the rod can extend through a surface of the grill, wherein the housing may be attached to the surface and/or extend through the surface, for example a table or a face of the grill. In some embodiments, the rod is a flexible shaft comprising metal and or plastic, for example a metal rod comprising one or more layers of metal cable or wire. In some embodiments, the adaptor can define a round, tri-point, or 5-point shape, for example a tri-point shape where the adaptor is configured to securely attach to a valve knob of a gas tank, for example a valve of a propane tank. In many embodiments, the rod is securely attached to the adaptor, for example through the use of a collar structure surrounding the rod at or near the end of the rod near the adaptor, in some cases the collar engages the rod through one or more pins or screws, or the collar can be squeezed or crimped around the rod. In some embodiments of the extension device, the user knob is attached to the rod by a screw, bolt, or pin. In various embodiments, the adaptor includes one or more tabs extending downward from the top of the adaptor, the tabs having one or more detents extending from an inner surface of the tab, wherein the one or more detents may be positioned to engage one or more valve knobs having one or more depths.

Also disclosed are methods for remotely operating a valve, the method comprising mounting an adaptor to a valve knob, wherein the adaptor is fixedly attached to a rod at a first end, and the rod is positioned within a housing, and the valve knob operates a valve, securedly engaging the adaptor to the valve knob, mounting a user knob to the rod at a second end, rotating the user knob, transferring the rotation of the user knob through the rod and to the adaptor; and thereby operating a valve. In some embodiments, the adaptor securely engages the valve knob with one or more pins, screws, bolts, tabs, detents, or a combination thereof, in some cases detents may be defined by an inner surface of a tab that may extend downward from one or more sides of the adaptor. In some embodiments, the rod may comprise one or more layers of wire and/or cable.

Also disclosed is an extension device for remotely operating a valve of a propane tank on a barbeque grill, the device comprising an adaptor comprising one or more tabs extending downward from an upper surface of the adaptor, the tabs defining one or more detents defined by the inner surface of the tab, a connector, comprising a housing and a rod positioned within the housing, wherein the rod comprises one or more layers of wire or cable, and is connected at one end to the adaptor and at the other end to a user knob; wherein the user knob is reversibly attached to the rod by a screw, pin, or bolt; and one or more clips configured to attach the housing to a barbeque grill.

BRIEF DESCRIPTION OF THE DRAWINGS

FIGS. 3A and 3B are detailed illustrations of one embodiment of an adaptor for use with the disclosed extension device.

FIGS. 5A and 5B are detailed illustrations of one embodiment of an adaptor for use with the disclosed extension device.

FIGS. 6A and 6B are detailed illustrations of one embodiment of connector for use with the disclosed extension device.

FIGS. 7A and 7B are detailed illustrations of one embodiment of the disclosed extension device showing engagement of one embodiment of the adaptor and connector.

FIGS. 9A and 9B are detailed illustrations of one embodiment of the disclosed extension device showing engagement of a user knob and a connector.

DETAILED DESCRIPTION

Disclosed herein are devices, methods, and systems for remotely opening and closing a control mechanism. In one embodiment, the control mechanism may be a valve on a tank, for example a propane tank. The disclosed devices, methods, and systems may allow the tank valve to be manipulated remotely, providing a more convenient and safer method for closing and opening the valve. The disclosed device includes a user knob, a flexible connector, and an adaptor. The user knob is designed to be grasped and rotated by a user, and may be located away from the adaptor and/or tank. The adaptor is designed to fixedly engage the control mechanism. The flexible connector is designed to transfer torque and rotational motion from the user knob to the adaptor, which may be located some distance from the user knob.

In many cases, the disclosed extension device improves comfort and convenience for the user. It permits opening and closing of a valve or turning of a valve without having to bend over, lean over, or stretch to reach the valve when it is situated in a lower position from the user's hand and/or behind or within a housing. For example, propane tanks for gas grills are often stored underneath or behind the burners, and may also be in an enclosed area. The disclosed extension device makes it easier to open and close a valve on a tank that is not easily accessible, and may also increase appliance safety, e.g., by not having to bend over near a burning grill. By easily being able to completely turn on/off the valve, the device may also reduce or prevent potential gas leaks. This results in an environmentally friendly grill and may save the user money.

Figure 1:
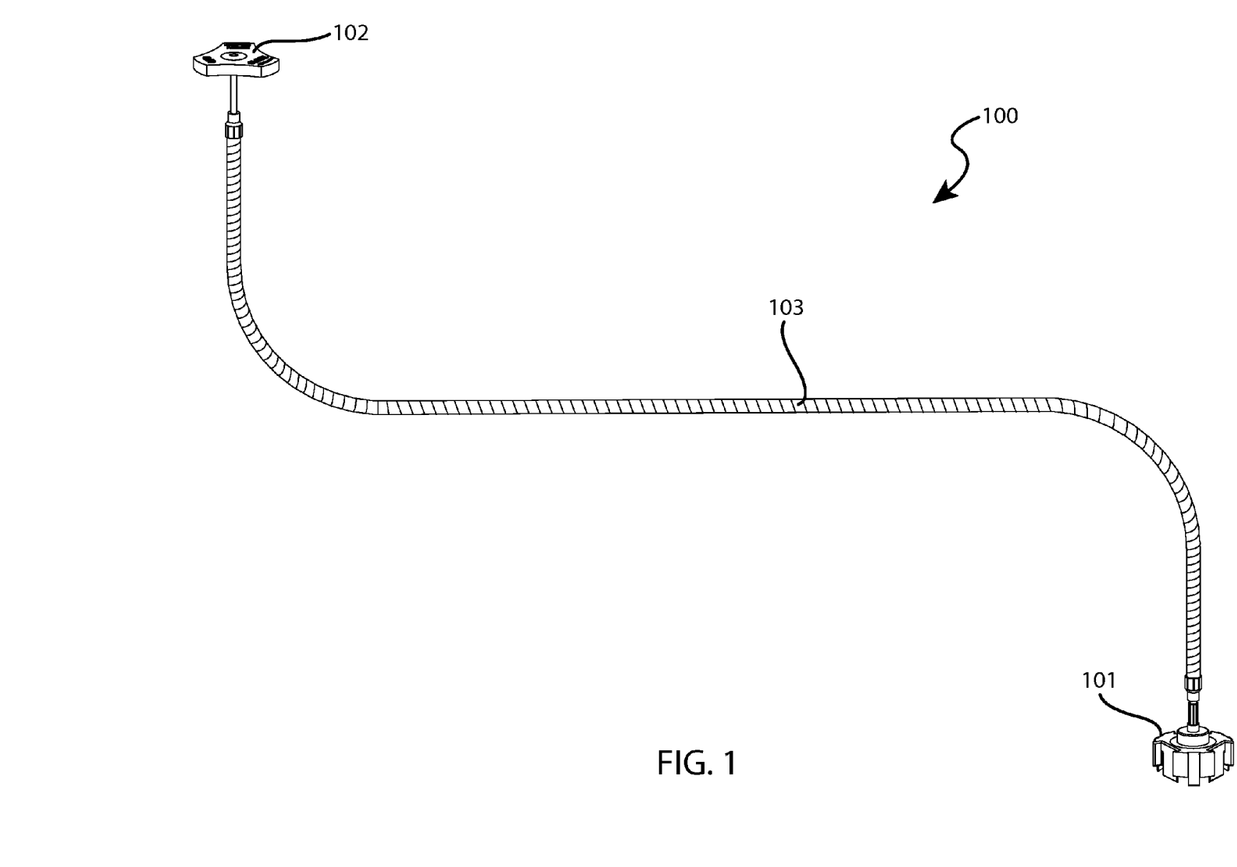
FIG. 1 is an illustration of one embodiment of the disclosed extension device.

One embodiment of the disclosed extension device is depicted in FIG. 1, and will be used for illustrating the disclosed device and its uses. In this embodiment, the disclosed extension device 100 may comprise an adaptor 101 for contacting a valve knob (such as on a propane tank), a user knob 102 that can be grasped by a user, and a connector 103 for connecting the user knob 102 and the adaptor 101.

Figure 2A:
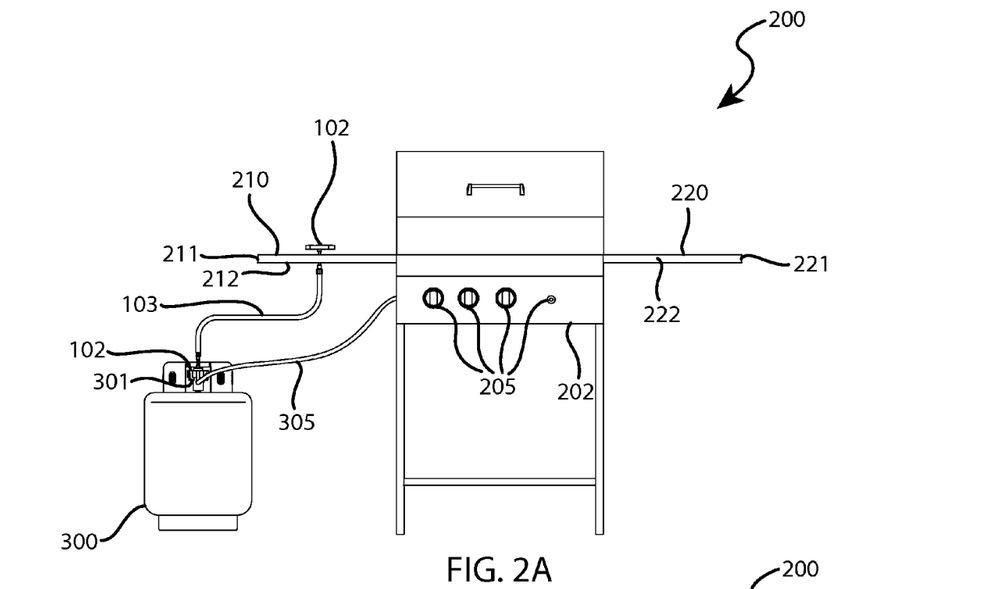
FIGS. 2A and 2B are illustrations of an embodiment of the disclosed extension device used with a gas barbeque grill.
Figure 2B:
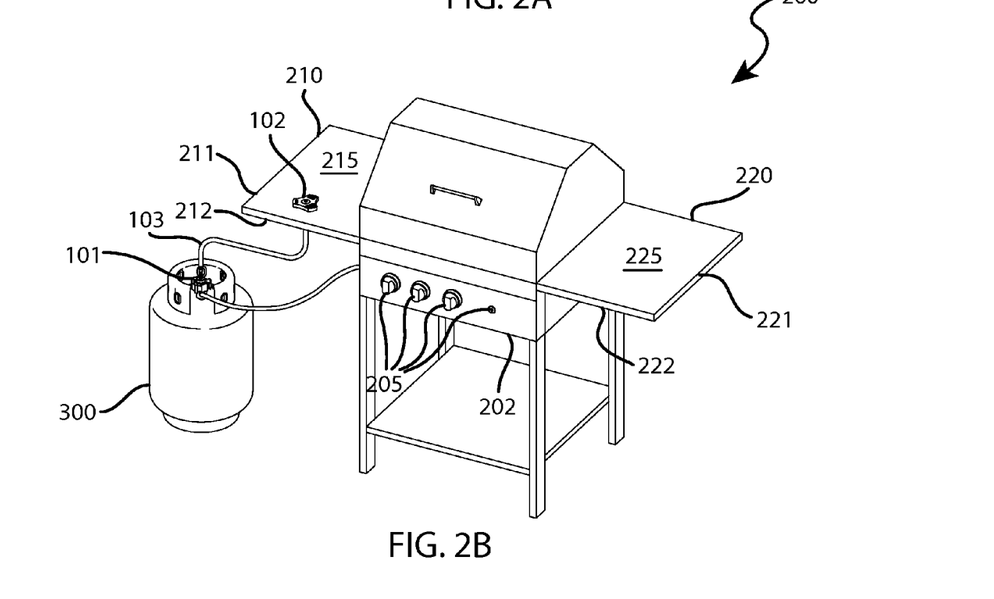

The embodiment depicted in FIG. 1, may be used with a propane barbeque grill, as depicted in FIG. 2. In this embodiment, use of a flexible connector 103 allows the user knob 102 to be placed in various positions on or near the grill 200. A gas tank 300, here a propane tank, is depicted near the grill 200, and connected via a hose 305, which carries gas to the burners, not shown. The adaptor 101 is designed to contact and securely attach to the propane tank's valve knob 301, such that rotational movement of the adaptor 101 causes the valve knob 301 (or tank knob) to rotate. Thus, when a user rotates the user knob 102, the rotation is transferred through the connector 103 to the adaptor 101, causing the valve knob 301 to rotate with the adaptor 101. In the embodiment shown in FIG. 2, the user knob is placed on the left side table 210, FIG. 2A shows that the user knob 102 is attached to a flexible connector that extends through a top surface 215 of the left side table 210. Other embodiments may attach the user knob 102 to a side edge 211 221 or a front edge 212 222 of a side table 210 220. In other embodiments, the user knob 102 may be positioned at or near the face 202 of the grill 200 along with other control devices 205, for example burner control knobs or ignition buttons. As discussed below, other positions are also possible.

Adaptor

The adaptor, or grip, is configured to be fitted and/or coupled to a valve knob or handle. The adaptor may be constructed of metal, carbon fiber, plastic, rubber, wood, acrylic, combinations thereof, and other suitable materials. The adaptor is configured such that the adaptor may mechanically engage the valve knob. In some embodiments, the adaptor is configured to fit over and/or around the valve knob, in order to engage the valve knob or handle. In most cases, the adaptor may be designed such that it may be adjusted to fixedly and securely engage the valve knob or handle, but disengage from the valve knob or handle when no longer need (for example when the tank is empty and being replaced with a tank with gas.

Figure 3A:
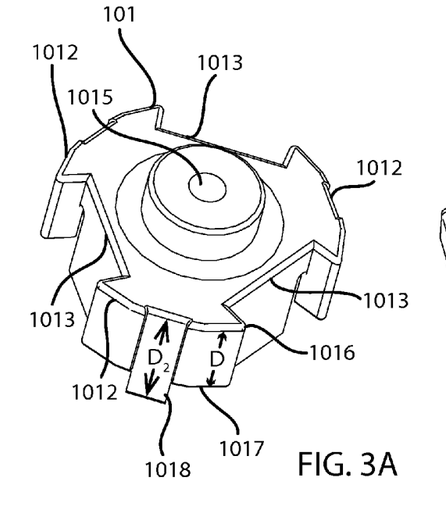
Figure 3B:
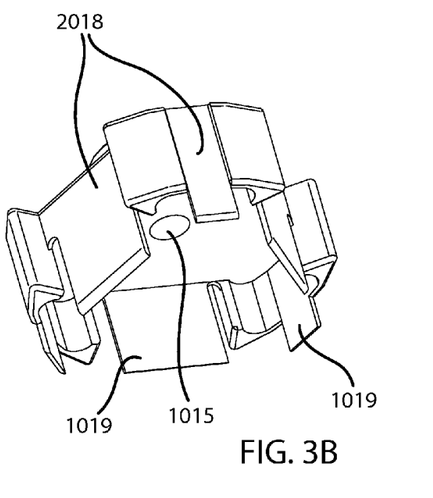
FIG. 3B shows the device in 3A in sectional view.
Figure 4:
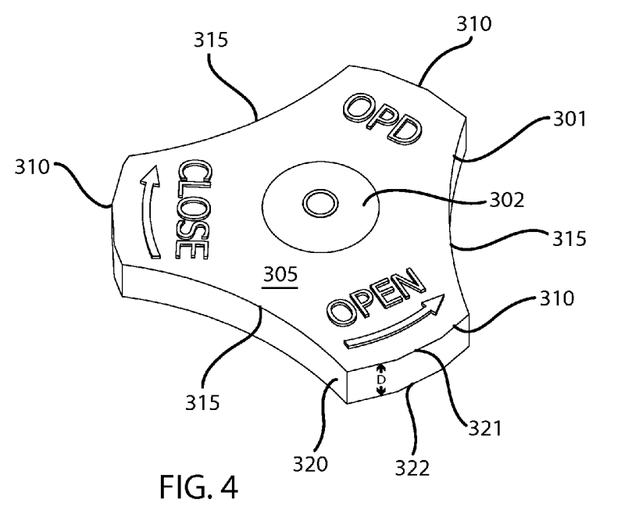
FIG. 4 is one type of valve knob that may be manipulated using the disclosed extension device.

One embodiment of the disclosed adaptor is depicted in FIG. 3. This embodiment is designed to engage a tri-point valve knob on a propane tank, which is the predominant shape for propane tank knobs in the United States. Other shapes for valve knobs are known, for example, round, 5-pointed, etc. FIG. 4 depicts a valve knob that may be used with the adaptor embodiment depicted in FIG. 3. The knob 301 shown at FIG. 4 has a top surface 310 with a plurality of edges. These edges are positioned at various distances from a center, the center defining a hole through the surface for accepting an attachment screw 302. The edges alternate between extensions 310 and recesses 315. Positioned at the edges and extending downward, is a skirt 320. The skirt may define a depth D, from the top edge 321 of the skirt 320 to a bottom edge 322.

FIG. 3 presents various views of one embodiment of the disclosed adaptor configured to engage the knob shown in FIG. 4. This adaptor embodiment has a multisided shape similar to that of the knob of FIG. 4. Specifically, referring first to FIG. 3A, the adaptor has a top surface 1011, with a plurality of edges positioned at various distances from a center 1015. These edges correspond to the knob 301 edges and define extensions 1012 and recesses 1013. The center, 1015 may define a hole in the top surface 1011 that may be configured to accept the connector 103. The adaptor 101 may also comprise a skirt 1014 extending downward from a top edge 1016 to a bottom edge 1017. The skirt 1014 may be continuous or may be discontinuous (as shown in FIG. 3). The skirt may define a depth, d from the top edge 1016 to the bottom edge 1017, which, in most cases, is greater than the depth D of the knob.

At various positions, the skirt may have a depth $d_2$ that is greater than d. These positions of the skirt may be referred to as tabs 1018. In the embodiment shown in FIG. 3, tabs are positioned at the adaptor's extensions 1012 and adaptor recesses 1013. Positioned at or near the bottom, inner surface of one or more of the tabs 1018, may be a catch or detent 1019. The detent may be positioned to extend below the lower edge 322 of the knob when the adaptor 101 engages the knob 301.

In many embodiments, as the adaptor 101 is lowered about the knob 301 the detent will press against the skirt 320 and deflect the tab outward. After the detent reaches and goes beyond the bottom of the skirt the tab will un-deflect, preventing the adaptor from lifting off the knob without intervention from the user. To disengage the adaptor 101 from the knob 301, a user will manually deflect the tab 1018 outward from the center of the adaptor 101 while moving the adaptor 101 away from the knob 301. When the detent 109 clears the bottom of the skirt 320, the adaptor 101 can be lifted off the knob 301.

Figure 5A:
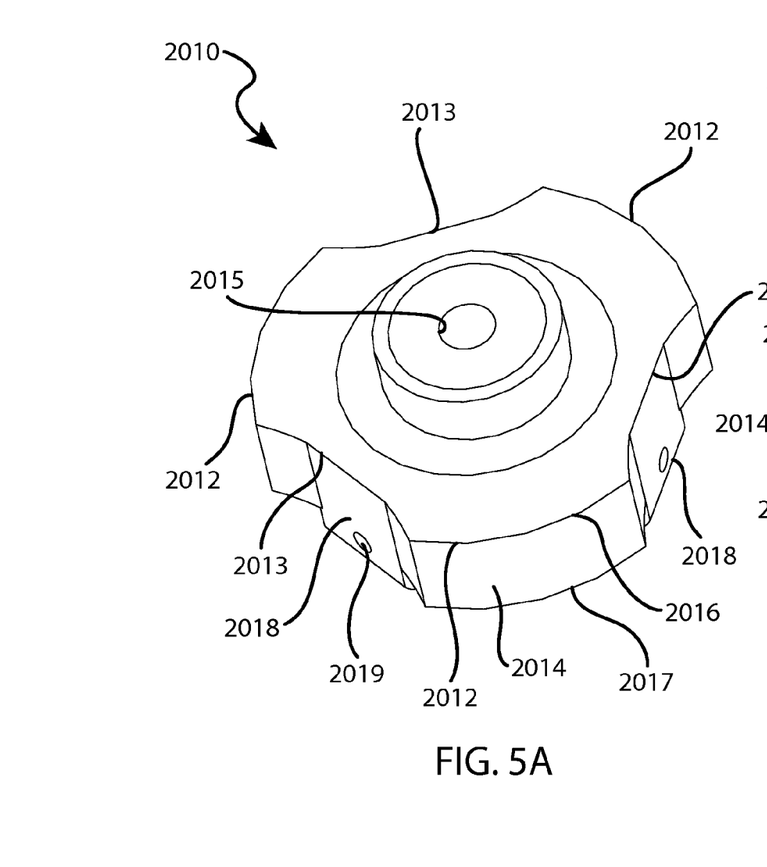
Figure 5B:
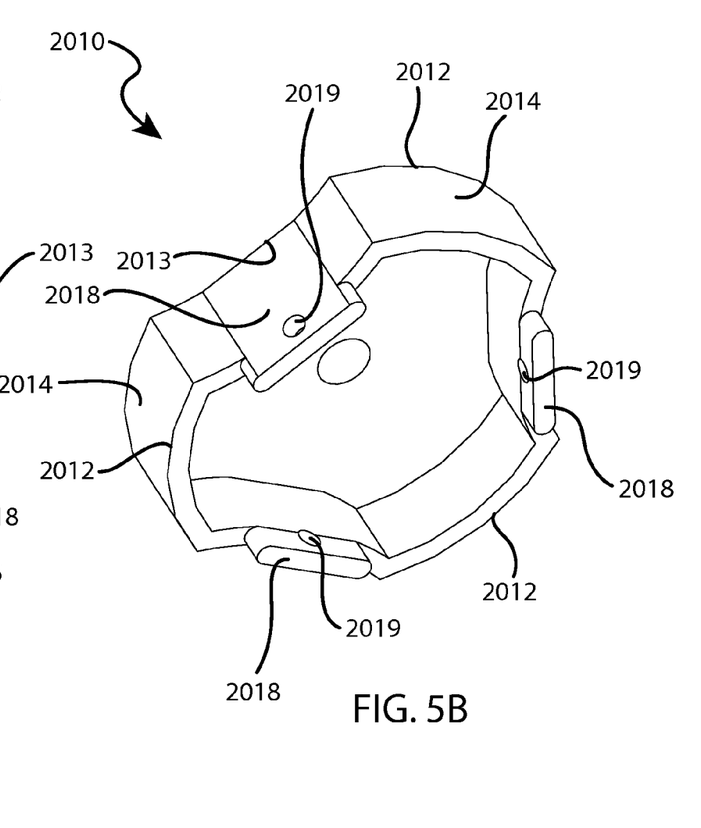
FIG. 5B shows the device in 5A in sectional view.

Other methods of reversibly connecting the knob 301 and adaptor 101 are contemplated. For example, set screws may be used to aid in engaging the adaptor and knob. One such embodiment is depicted in FIG. 5. The adaptor 2010 of FIG. 5 includes many of the same structures as in the adaptor 101 of FIG. 4. This adaptor embodiment 2010 is also able to engage the tri-pointed knob 301 shown in FIG. 3. The adaptor 2010 includes a top surface 2011 and a plurality of edges 2012 2013 radiating from a center 2015. Extending downward from the edges 2012 2013 is a skirt 2014, which defines a depth $d_{pin}$, from the top edge 2016 to a bottom edge 2017. Positioned at one or more recesses 2013 or extensions 2012 may be a tab 2018. In general the tab may extend beyond the bottom of the skirt 2017, and define a greater depth. In this embodiment, the tabs define a hole 2019. The hole 2019 may be configured to accept a pin, or screw (not shown) that may aid in securing the adaptor 2010 and the knob 301. In some embodiments, the skirt does not include tabs and the holes may be defined by the skirt. In most cases, the distance between the hole and the upper edge of the skirt is greater than the depth D of a skirt on a knob to which the adaptor will be engaged. This may help to place a pin or screw below the bottom edge of the knob skirt and prevent the adaptor from lifting off the knob. In other embodiments, the screws or pins may contact the skirt, between its top and bottom edges.

In some embodiments of the adaptor, a spacer may be positioned between the top surface of the knob 305 and the bottom surface of the adaptor. In some embodiments, the spacer may be positioned in contact with the bottom surface of the adaptor before the adaptor is placed over the knob. In some embodiments, the spacer may include an adhesive material that may aid in adhering the spacer to the bottom of the adaptor. The spacer may aid in creating a snug fit between the knob and the adaptor. This may be the case where the skirt of the adaptor is large compared to the skirt of the knob. One or more spacers may be placed on the surface of the knob to aid in creating a good engagement.

The adaptor may be pre-formed to mate with a particular valve knob shape, size, and depth, or may be adjustable to adapt to a variety of valve knobs. Thus, the adaptor may include one or more structures for aiding adaption to valve knobs of differing shapes and sizes. For example, in the United States, propane tank valve knobs have a standard tri-shape, but tanks with previous five-pointed knobs exist. In order to aid in adapting to valve knobs of varying shapes, the adaptor may include one or more clips, tabs, screws, or other mechanisms that aid in attaching the adaptor to the valve knob or handle, such that the clips, tabs, screws may be adjusted to securely and fixedly connect the adaptor to the valve knob. In some cases, a spacer may be positioned between the valve knob and the adaptor to aid in creating a secure and fixed relationship.

The adaptor may be permanently or reversibly attached to the connector. In some cases the adaptor is molded with the connector in place. In some cases, the connector is inserted into a receiving structure defined by the adaptor, and the connector is held in place by a tab, detent, or other securing structure, such as a pin, screw, or bolt. Where the adaptor includes a structure for receiving the connector, the structure may be a recess, port, or hole defined by the upper portion of the adaptor. The receiving structure is typically located at or near the center of the adaptor. In some embodiments, the adaptor is modified to directly engage the valve without the need for a knob.

Connector

The disclosed connector comprises a flexible rod housing (shaft housing or tube) and a flexible rod, positioned within the housing. The connector may be constructed of any material that will allow the connector rod or shaft and housing to flex. In some embodiments, the housing and rod are constructed of the same or similar materials, whereas in other embodiments the materials may differ. The flexibility of the connector allows the propane tank to be placed in various positions near the grill and within reach of the extension device. In addition, the flexible connector may allow the user to select propane tanks of various shapes and sizes for use with the same grill. In some embodiments, the housing is constructed of metal or plastic. In some embodiments the housing is a continuous housing, for example a tube or a helical housing. In some embodiments, the housing may comprise two or more. The rod or shaft housing may comprise a plurality of segments that may be discrete or may be part of a larger coil or spiral.

The housing defines an outer surface and an inner surface. The inner surface defines an interior space or channel. Positioned within this interior space may be a rod or shaft. The rod may be constructed of various materials that allow for it to flex within the housing, for example metal and/or plastic, for example, aluminum, steel or brass. In some embodiments, the rod may be a cable and may be covered for example by a plastic, neoprene, or/and stainless steel outer sheath. In other embodiments, the rod is a coil, spring, and/or mechanical linkages or "vertebrae." The rod may be a continuous structure, or may be segmented, with the segments allowing rotation around a long axis of the rod. In some embodiments, the rod may be comprised of several layers of wire wrapped around a central wire, wherein each layer of wire wrap is wound around the central wire in a direction that is opposite of the adjacent layer. In some embodiments, each layer may comprise one or more wires.

Figure 6A:
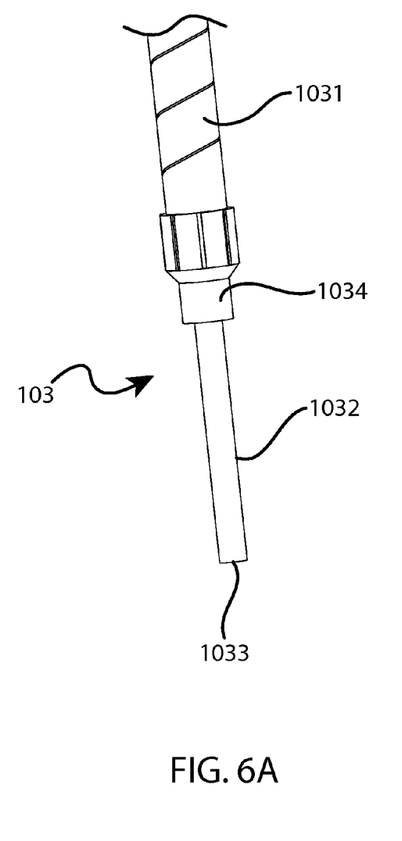
Figure 6B:
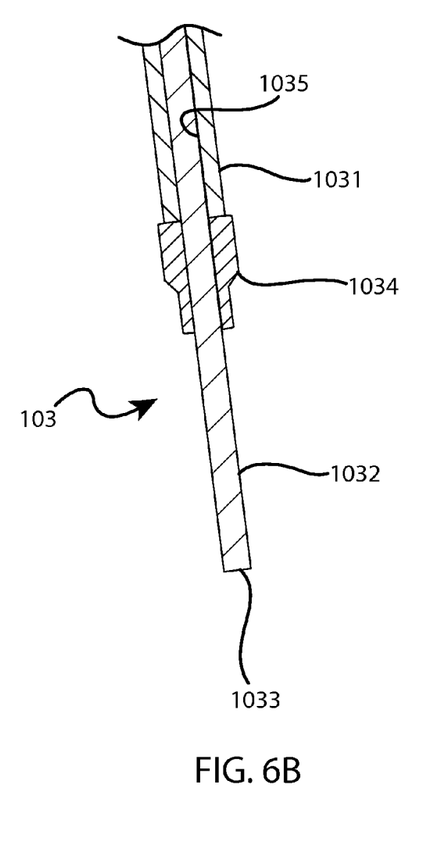
FIG. 6B shows the device in 6A in sectional view.

FIG. 6 shows one embodiment of the disclosed connector. The connector embodiment 103 in FIG. 6A shows the housing 1031 with the rod 1032 exiting housing. The housing terminates at fitting 1034. The rod 1032 exits the housing 1031 through the fitting, and terminates at an end 1033. FIG. 6B is a sectional view of the connector 103 in FIG. 6A. In this view, the interior surface 1035 of the housing 1031 is shown. In the embodiment shown in FIGS. 6A and 6B, the flexible rod 1032 is depicted as a solid structure, as discussed above, in many embodiments, the flexible rod is constructed from successive layers of wire wrapped around one or more wires, with each layer wound in direction opposite that of the adjacent layers. In many cases, each layer may comprise more than one wire.

User Knob

In many cases, the user knob may resemble in shape and size the valve knob. In other embodiments, the user knob is designed for easier grasping by a user. For example, the user knob may be larger and/or may define a lever. The user knob defines an upper surface and a lower surface. The lower surface of the user knob may define a hole in the surface, or collar structure that may extend away from the lower surface. The hole or collar may be configured to accept an end of the flexible rod of the connector.

In use, torque may be applied to the knob and transferred to the grip through the flexible shaft. In some embodiments, ratcheting mechanism may be included with the disclosed device.

Connector/Adaptor Engagement

The flexible rod of the connector may directly or indirectly engage the adaptor. In some embodiments, an end of the flexible rod is inserted into a hole at the center of the top surface of the adaptor. The flexible rod may be securely held by the adaptor in a variety of methods. For example, the rod may be inserted into the hole during molding of the adaptor, such that the adaptor is molded around the rod. In other embodiments, the rod may be engaged by pins or screws. In other embodiments, the adaptor may include a collar structure at the hole in the top surface that is designed to receive the rod end. In some embodiments, the collar's surface may define holes for engaging the inserted rod with one or more pins or set screws. In some embodiments, the collar may be squeezed or crimped such that the collar compresses and holds the rod securely.

The end of the rod and the hole in the adaptor may be configured to prevent slippage when a rotational force is applied. For example, in some embodiments the end of the rod defines a triangular, square, pentagonal, hexagonal, or other shape, while the adaptor hole defines a similar and corresponding shape.

Figure 7A:
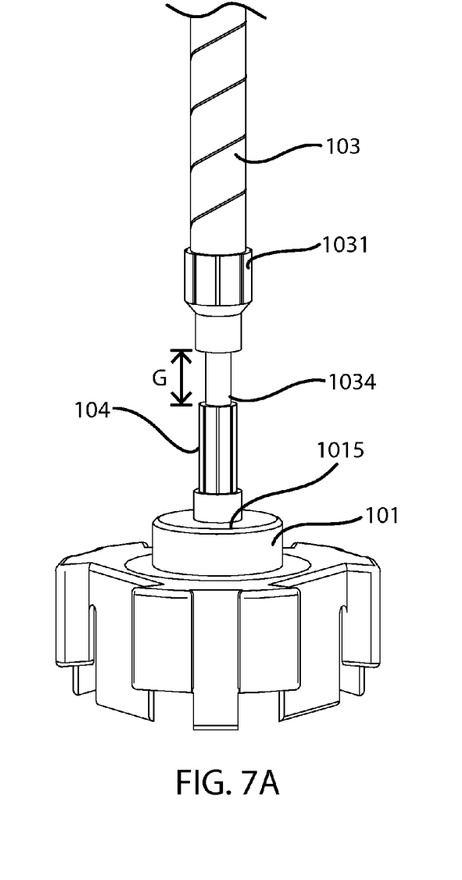
Figure 7B:
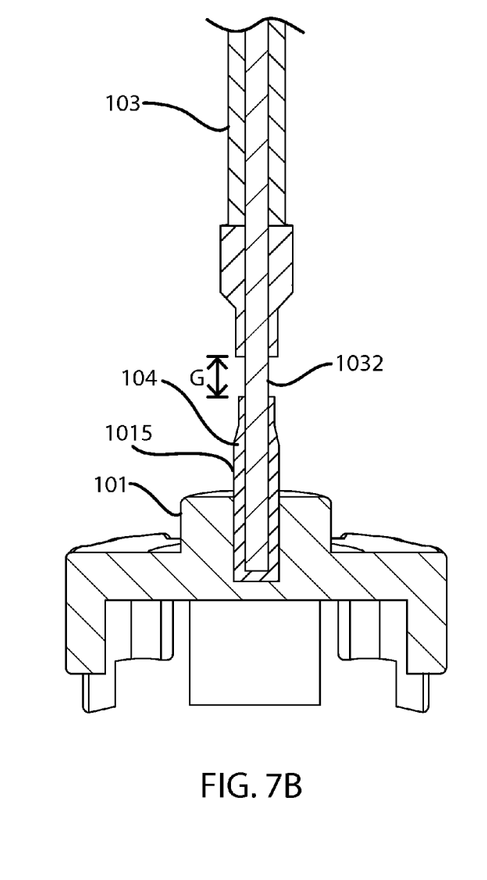
FIG. 7B shows the device in 7A in sectional view.

FIG. 7 depicts one embodiment of the disclosed extension device wherein the adaptor and flexible rod are directly engaged. In this embodiment, the adaptor includes a collar 104 that is positioned within the hole 1035 defined in the top surface of the adaptor 101. The collar may be manufactured of various materials, and may be securely attached to the adaptor, or may be contiguous with the adaptor material, in this embodiment the collar 104 is depicted as a separate structure. The collar 104 is also securely attached to the rod 1032. This connection may be through various methods and structures, including pins, screws, crimping, molding in place, welding, and combinations thereof. Also shown in FIG. 7 is a gap, g, between the collar and the fitting 1034, wherein the flexible rod is visible. In most cases the gap, g, is less than about 10 cm, 9 cm, 5 cm, 4 cm, 3 cm, 2 cm, 1 cm, 9 mm, 8 mm, 7 mm, 6 mm, 5 mm, 4 mm, 3 mm, 2 mm, or 1 mm, and greater than about 0.5 mm, 1 mm, 2 mm, 3 mm, 4 mm, 5 mm, 6 mm, 7 mm, 8 mm, 9 mm, 1 cm, 2 cm, 3 cm, 4 cm, 5 cm, 6 cm, 7 cm, 8 cm, or 9 cm.

Figure 8:
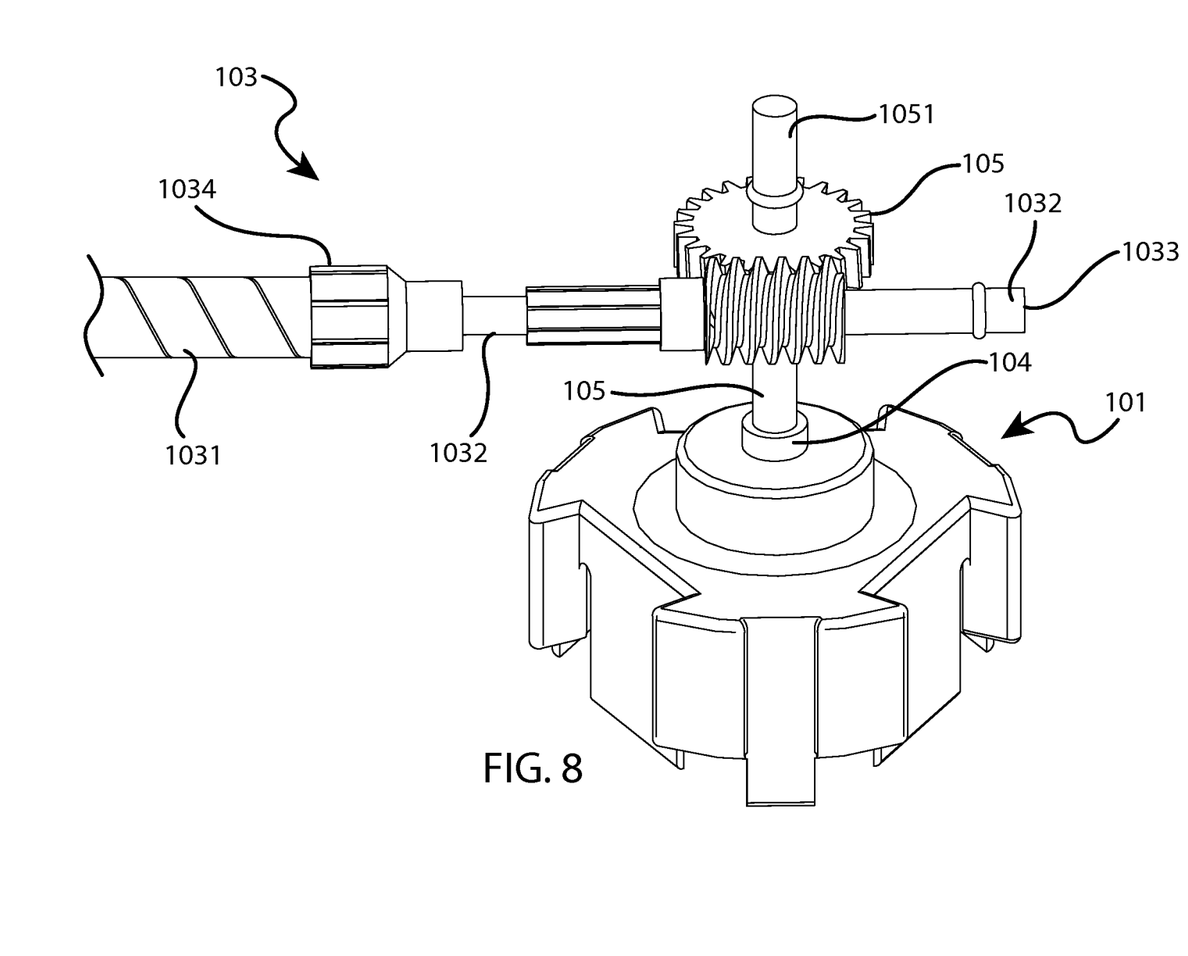
FIG. 8 is a detailed illustration of one embodiment of the disclosed extension device showing indirect engagement of an adaptor and a connector.

Another embodiment for engaging the flexible rod and adaptor is depicted in FIG. 8. In this embodiment, the engagement is indirect, and may be used wherein there is limited space above the valve knob such that direct engagement is difficult. This indirect engagement allows the rod and valve to engage at an angle. As shown in this embodiment, rotation of the rod results in rotation of the adaptor through the actions of a screw 1036 and cog 105. In this case, the rod 1032 rotates a screw 1036 that surrounds the rod 1032 at or near the end of the rod 1033. The screw 1036 is engaged with a cog 105 that is positioned about an axle 1051. Rotation of the screw 1036 rotates the cog 105 and the axle 1051, which is securely attached to the adaptor at the hole, or, as depicted here, a collar 104. In other embodiments, the screw may be positioned on the axle and the cog on the rod. A variety of structures are available to secure the positions of the rod and axle to prevent disengagement. These structures are well known in the art.

Connector/User Knob Engagement

The flexible rod of the connector may directly or indirectly engage the adaptor. In most embodiments, the engagement will be direct. In many embodiments, the end of the flexible rod, opposite that end positioned near the adaptor, is inserted into a hole or collar positioned near the center of the bottom surface of the user knob. The flexible rod may be securely attached or held by the user knob by a variety of methods. In many embodiments, the engagement may be secure but not permanent so that the user knob may be disengaged and re-engaged by the user. This ability to dis-engage and re-engage the user knob may aid the user in selecting among various methods of mounting the user knob and extension device to the grill.

In many embodiments, the rod may be inserted into the hole in the user knob and secured by pins or screws or other structures that may allow the user to disengage and reposition the user knob and connector. In most embodiments, the user knob includes a collar structure at the hole in the top surface that is designed to receive the rod end, and may define one or more holes for insertion of pins, screws, or bolts. In other embodiments, such as where the engagement between user knob and connector is intended to be more permanent, the collar may be squeezed or crimped such that the collar compresses and holds the rod securely.

As with the engagement structures of the adaptor and flexible rod, the end of the rod and the hole in the user knob may be configured to prevent slippage when a rotational force is applied. For example, in some embodiments the end of the rod defines a triangular, square, pentagonal, hexagonal, or other shape, while the adaptor hole defines a similar and corresponding shape.

Figure 9A:
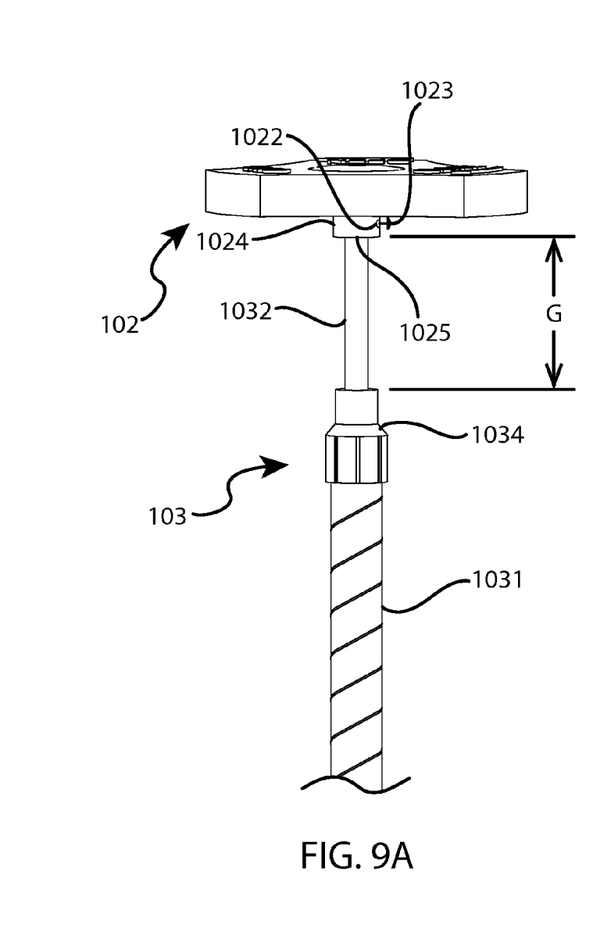
Figure 9B:
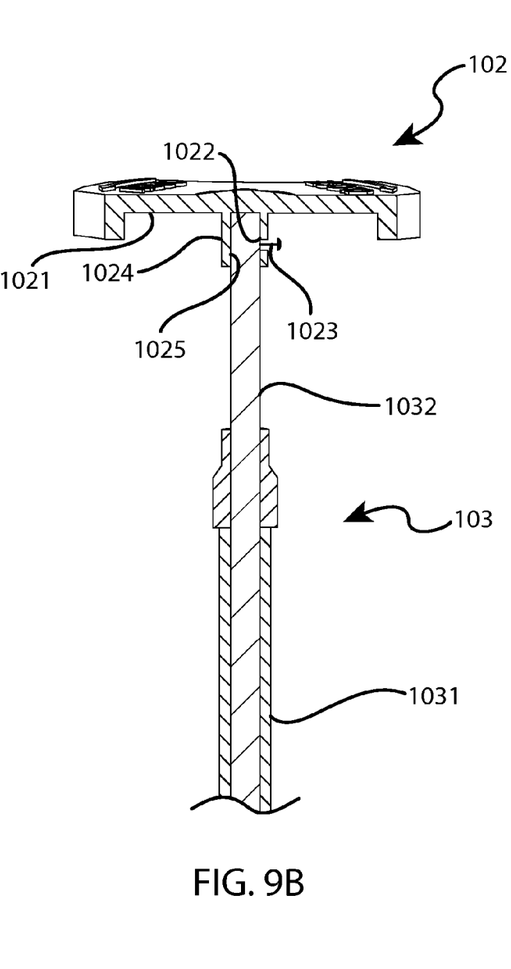
FIG. 9B shows the device in 9A in sectional view.

FIG. 9 depicts one embodiment of the connector and user knob fixedly engaged. In this embodiment, the user knob 102 includes a hole 1025 positioned on the under surface 1021 of the user knob. A collar 1022 may define the hole 1025, and may include one or more holes 1022 on its outer surface. The holes 1022 on the outer surface are configured to accept a pin or screw 1023, while the inner hole 1025 is configured to accept the rod 1032. The rod 1032 is inserted into the collar 1024 and held fixedly in place by the pin or screw 1023. The pin or screw may press against the rod or may enter the rod at a receiving hole (not shown).

As in the engagement of the adaptor to the connector, FIG. 9 depicts a gap, G, between the user knob collar and the fitting 1034 of the connector, wherein the flexible rod is visible. In most cases the gap, g, is less than about 10 cm, 9 cm, 5 cm, 4 cm, 3 cm, 2 cm, 1 cm, 9 mm, 8 mm, 7 mm, 6 mm, 5 mm, 4 mm, 3 mm, 2 mm, or 1 mm, and greater than about 0.5 mm, 1 mm, 2 mm, 3 mm, 4 mm, 5 mm, 6 mm, 7 mm, 8 mm, 9 mm, 1 cm, 2 cm, 3 cm, 4 cm, 5 cm, 6 cm, 7 cm, 8 cm, or 9 cm. In most embodiments, the gap, g or G, is low to prevent excessive movement of the rod outside the housing.

Uses for the Extension Device

The example extension knob may be also used with other types of gas cylinders such as compressed gas cylinders such as helium, used for filling balloons, or other gases used for instance in a lab or manufacturing facility. These gases must be secured and if there are many of them opening and closing of valves of gas cylinders in a second row for instance may be challenging. Other uses for the example extension device are also contemplated. Further examples include, but are not limited to any valve or other handle operated device (e.g., water taps), especially those which may be remotely located (e.g., within an engine compartment). Another use for the disclosed device is to allow heaters or stoves in temporary spaces (e.g. ice fishing house) to be fed by gas tanks located outside the space.

Many gas tanks manufactured and sold in the United States require the user to apply about 16 lb/in to the knob in order to open and close the valve. The disclosed extension device is designed to translate this force from the user knob to the valve knob with little or no loss in force. Thus, in many cases, the disclosed extension device is intended to apply torque at the valve knob of greater than 10 lb/in, 11 lb/in, 12 lb/in, 13 lb/in, 14 lb/in, 15 lb/in, 16 lb/in, 17 lb/in, 18 lb/in, 19 lb/in, 20 lb/in, 21 lb/in, 22 lb/in, 23 lb/in, 24 lb/in, 25 lb/in, 26 lb/in, 27 lb/in, 28 lb/in, 29 lb/in, 30 lb/in, 31 lb/in, or 32 lb/in, and less than about 33 lb/in, 32 lb/in, 31 lb/in, 30 lb/in, 29 lb/in, 28 lb/in, 27 lb/in, 26 lb/in, 25 lb/in, 24 lb/in, 23 lb/in, 22 lb/in, 21 lb/in, 20 lb/in, 19 lb/in, 18 lb/in, 17 lb/in, 16 lb/in, 15 lb/in, 14 lb/in, 13 lb/in, 12 lb/in, or 11 lb/in.

The example extension device enables a user to turn a valve handle from a remote location, for example at about waist level of the user, such that the user does not have to bend or lean over or around the grill area to open and/or close the valve of a propane tank.

In some embodiments, the connector may be secured to the grill or other structure to prevent movement of the connector during use. In some embodiments, a pipe strap may be used to secure the flexible housing to a surface of the grill and/or other apparatus (e.g., table or wall). This connection may be placed anywhere along a connector, for example the middle.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

Although the present disclosure has been described with a certain degree of particularity, it is understood the disclosure has been made by way of example, and changes in detail or structure may be made without departing from the spirit of the disclosure as defined in the appended claims.

I claim:

1. An extension device for remotely operating a valve of a propane tank on a barbeque grill, the device comprising:
    an adaptor configured for the reversible attachment to the valve of the propane grill, the adaptor defining a tri-point or 5-point shape, and three or five tabs extending downward from an upper surface of the adaptor, each tab angled inwards towards a center of the adaptor and comprising a detent that extends from a lower portion of an inner surface of the tab;
    a connector, comprising a housing and a rod positioned within the housing, wherein the rod comprises one or more layers of wire or cable and is able to be bent without permanent deformation, and is connected at one end to the adaptor and at the other end to a user knob; wherein the user knob is reversibly attached to the rod by a screw, pin, or bolt.

2. The extension device of claim 1, wherein the housing is configured to attach to a side of a grill at or near the user knob, or configured to allow the rod to extend through a surface of the grill.

3. The extension device of claim 2, wherein the surface of the grill is a table or a face of the grill.

4. The extension device of claim 1, further comprising one or more clips configured to attach the housing to a barbeque grill.

5. The extension device of claim 1, wherein the user knob is reversibly attached to the rod by a screw.

6. The extension device of claim 1, wherein the user knob is reversibly attached to the rod by a pin.

7. The extension device of claim 1, wherein the user knob is reversibly attached to the rod by a bolt.

8. The extension device of claim 1, wherein the adaptor defines a tri-point shape, and three straight tabs extending downward.

9. The extension device of claim 1, wherein the adaptor defines a 5-point shape, and five straight tabs extending downward.

10. The extension device of claim 1, wherein the rod is securedly attached to the adaptor.

11. The extension device of claim 10, wherein a collar structure surrounds the rod at or near the end of the rod near the adaptor.

12. The extension device of claim 11, wherein the collar engages the rod through one or more pins or screws.

13. The extension device of claim 11, wherein the collar is squeezed or crimped around the rod.

14. A method for remotely operating a valve of a propane tank on a barbeque grill, the method comprising
    mounting an adaptor configured for the reversible attachment to the valve of the propane grill, the adaptor defining a tri-point or 5-point shape, and three or five tabs extending downward from an upper surface of the adaptor, each tab angled inwards towards a center of the adaptor and comprising a detent that extends from a lower portion of an inner surface of the tab;
    connecting a first end of a connector to the adaptor, the connector comprising a housing and a rod positioned within the housing, wherein the rod comprises one or more layers of wire or cable and is able to be bent without permanent deformation, and
    connecting a second end of the connector to a user knob.

15. The method of claim 14, further comprising reversibly attaching the user knob to the rod by a screw, pin, or bolt.

16. The method of claim 9, wherein the user knob is reversibly attached to the rod by a screw.

17. The method of claim 9, wherein the user knob is reversibly attached to the rod by a pin.

18. The method of claim 9, wherein the user knob is reversibly attached to the rod by a bolt.

19. The method claim 14, wherein the adaptor defines a tri-point shape, and three straight tabs extending downward.

20. The method of claim 14, wherein the adaptor defines a 5-point shape, and five straight tabs extending downward.

* * * * *

UNITED STATES PATENT AND TRADEMARK OFFICE
CERTIFICATE OF CORRECTION

PATENT NO.        : 9,562,622 B2
APPLICATION NO.   : 14/562190
DATED             : February 7, 2017
INVENTOR(S)       : Adam Civilla It is certified that error appears in the above-identified patent and that said Letters Patent is hereby corrected as shown below:

In the Claims

Column 9, Claim 1, Line 55, delete "propane grill" and insert -- propane tank --, therefor.

Column 10, Claim 14, Line 38, delete "propane grill" and insert -- propane tank --, therefor.

Column 10, Claim 16, Line 52, delete "claim 9" and insert -- claim 14 --, therefor.

Column 10, Claim 17, Line 54, delete "claim 9" and insert -- claim 14 --, therefor.

Column 10, Claim 18, Line 56, delete "claim 9" and insert -- claim 14 --, therefor.

Signed and Sealed this
Sixteenth Day of April, 2019

Andrei Iancu
*Director of the United States Patent and Trademark Office*